(12) United States Patent
Gill

(10) Patent No.: US 7,446,982 B2
(45) Date of Patent: Nov. 4, 2008

(54) PINNING STRUCTURE WITH TRILAYER PINNED LAYER

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 360 days.

(21) Appl. No.: 10/884,397

(22) Filed: Jul. 1, 2004

(65) Prior Publication Data
US 2006/0002038 A1    Jan. 5, 2006

(51) Int. Cl.
*G11B 5/39*    (2006.01)
(52) U.S. Cl. .................................. 360/324.11; 360/314
(58) Field of Classification Search ................. 360/314, 360/324.11
See application file for complete search history.

(56) References Cited

U.S. PATENT DOCUMENTS

| | | | | |
|---|---|---|---|---|
| 5,112,701 A | * | 5/1992 | Katsuragawa | 428/821 |
| 5,287,238 A | * | 2/1994 | Baumgart et al. | 360/314 |
| 5,583,725 A | * | 12/1996 | Coffey et al. | 360/324.11 |
| 5,701,223 A | * | 12/1997 | Fontana et al. | 360/324.11 |
| 6,132,892 A | | 10/2000 | Yoshikawa et al. | 428/692 |
| 6,210,818 B1 | * | 4/2001 | Saito | 428/811.2 |
| 6,219,205 B1 | * | 4/2001 | Yuan et al. | 360/319 |
| 6,222,707 B1 | | 4/2001 | Huai | 360/324.1 |
| 6,252,750 B1 | * | 6/2001 | Gill | 360/324.11 |
| 6,587,317 B2 | * | 7/2003 | Gill | 360/324.11 |
| 6,953,601 B2 | * | 10/2005 | Li et al. | 427/131 |
| 2002/0024778 A1 | * | 2/2002 | Xue et al. | 360/324.1 |
| 2003/0053267 A1 | | 3/2003 | Horng et al. | 360/324.1 |
| 2003/0167625 A1 | | 9/2003 | Li et al. | 29/603.07 |
| 2003/0227724 A1 | | 12/2003 | Li et al. | 360/324.12 |
| 2004/0021991 A1 | | 2/2004 | Horng et al. | 360/324.1 |
| 2004/0165320 A1 | * | 8/2004 | Carey et al. | 360/324.11 |

OTHER PUBLICATIONS

M. Covington, A. Rebei, G.J. Parker, and M.A. Seigler, "Spin Momentum Transfer in Current Perpendicular to the Plane Spin Valves," White Paper, Seagate Research, 1251 Waterfront Place, Pittsburgh, PA 15222.
M. Covington, M. AlhajDarwish, Y. Ding, N.J. Gokemeijer, and M.A. Seigler, "Current Induced Magnetization Dynamics in Current Perpendicular to the Plane Spin Valves," White Paper, Seagate Research, 1251 Waterfront Place, Pittsburgh, PA 15222.
M. Tsunoda, K. Nishikawa, T. Damm, T. Hashimoto, M. Takahashi, "Extra Large Unidirectional Anisotropy Constant of Co-Fe-/Mn-Ir Bilayers With Ultra-Thin Antiferromagnetic Layer," 2002, Journal of Magnetism and Magnetic Materials 239 (2002) 182-184, www.elsevier.com/locate/jmmm.
M. Covington, A. Rebei, G.J. Parker, and M.A. Seigler, "Spin Momentum Transfer in Current Perpendicular to the Plane Spin Valves," White Paper, Seagate Research, 1251 Waterfront Place, Pittsburgh, PA 15222, (2003).
M. Covington, M. AlhajDarwish, Y. Ding, N.J. Gokemeijer, and M.A. Seigler, "Current Induced Magnetization Dynamics in Current Perpendicular to the Plane Spin Valves," White Paper, Seagate Research, 1251 Waterfront Place, Pittsburgh, PA 15222, (2004).

* cited by examiner

*Primary Examiner*—Andrea Wellington
*Assistant Examiner*—Carlos E Garcia
(74) *Attorney, Agent, or Firm*—Zilka-Kotab, PC

(57) ABSTRACT

A magnetoresistive sensor having a trilayer structure for improved pinning. The pinned layer is exchange coupled with a IrMnCr AFM layer, and has a three ferromagnetic layer, the center one comprising $Co_{50}Fe_{50}$ and V.

24 Claims, 3 Drawing Sheets

PINNING STRUCTURE WITH TRILAYER PINNED LAYER

FIELD OF THE INVENTION

The present invention relates to giant magnetoresistive (GMR) sensors and more particularly to a sensor having improved pinned layer stability.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer. More recently, researchers have focused on the use of IrMnCr as an AFM layer for setting pinning of pinned layers in GMR sensors. The use of IrMnCr promises to reduce gap height (i.e. bit length) because a thinner AFM layer is possible with the use of IrMnCr than is possible with PtMn. However, the use of IrMnCr AFM layers present challenges due to the poor exchange coupling of IrMnCr with the materials of the pinned layer. So far, less than desired pinning has resulted.

Therefore, there remains a need for a pinned layer structure that can take advantage of the reduced gap height that is possible from the use of IrMnCr, while providing the robust pinning needed to avoid pinned layer flipping.

SUMMARY OF THE INVENTION

The present invention provides a giant magnetoresistive GMR sensor having improved pinned layer stability. The sensor includes a magnetic pinned layer, a magnetic free layer and a non-magnetic spacer layer separating the free and pinned layers. Pinning is assisted by a layer of antiferromagnetic material that is exchange coupled with the pinned layer. The pinned layer structure includes first, second and third antiparallel coupled ferromagnetic layers, the first ferromagnetic layer being antiparallel coupled with the second ferromagnetic layer and the second ferromagnetic layer being antiparallel coupled with the third ferromagnetic layer. The second ferromagnetic layer comprises CoFeV.

The trilayer structure provides improved pinned layer stability by including a middle AP coupled ferromagnetic layer that has a very high magnetostriction to provide magnetic anistotropy and also has a high electrical resistivity to avoid current shunting.

The antiferromagnetic layer (AFM) can be IrMnCr, and the first ferromagnetic layer of the pinned layer may be CoFe having about 23 atomic percent Fe. The $CoFe_{23}$ of the first ferromagnetic layer will advantageously provide very good exchange coupling with the AFM.

The second ferromagnetic layer can be constructed of $Co_{49}Fe_{49}V_2$ and can have a thickness of about 24 Angstroms. The third ferromagnetic layer can be $CoFe_{10}$ and can have a thickness of about 20 Angstroms. The $CoFe_{10}$ of the third ferromagnetic layers advantageously combines with the spacer (which can be Cu) to promote excellent spin dependent scattering of electrons for exceptional GMR effect.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
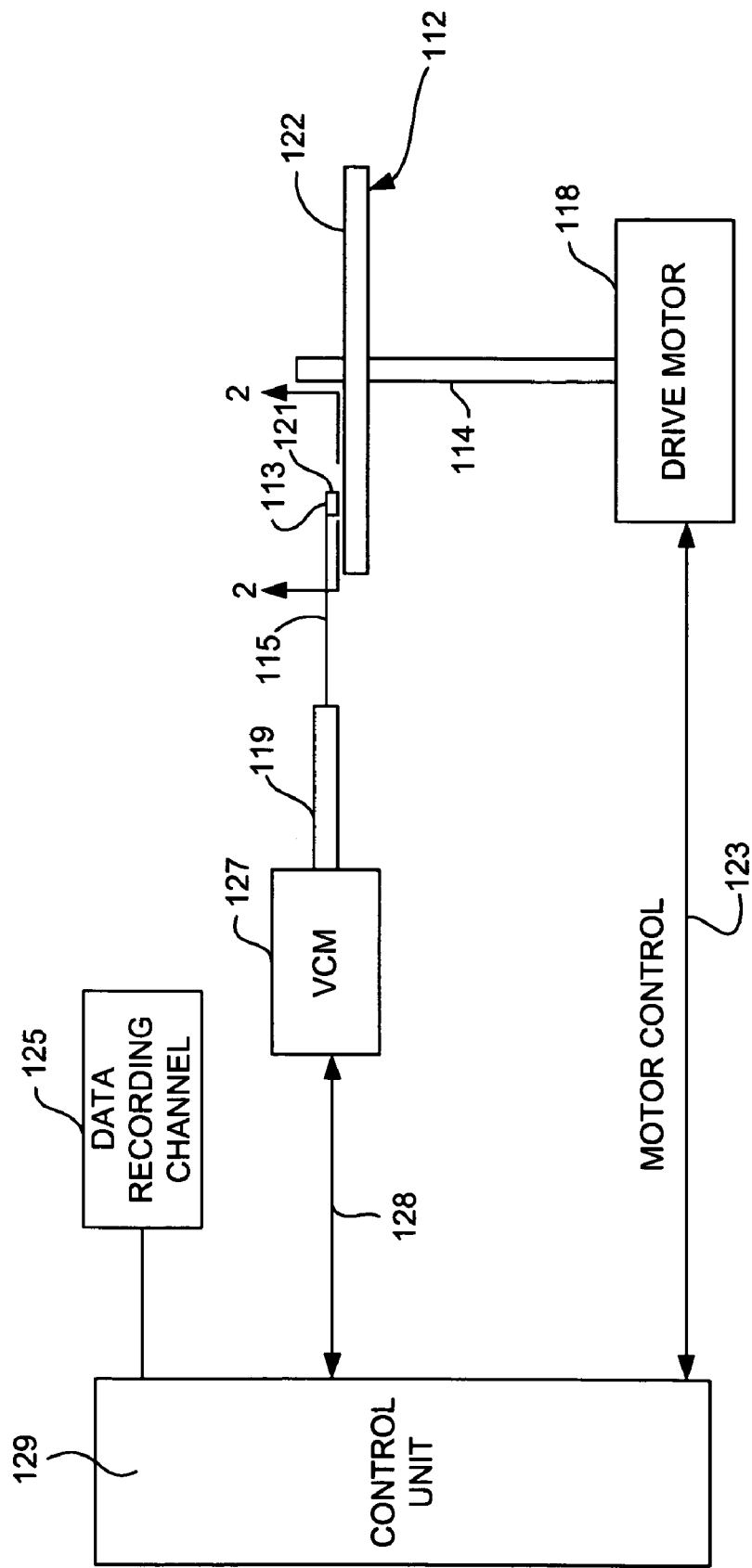
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
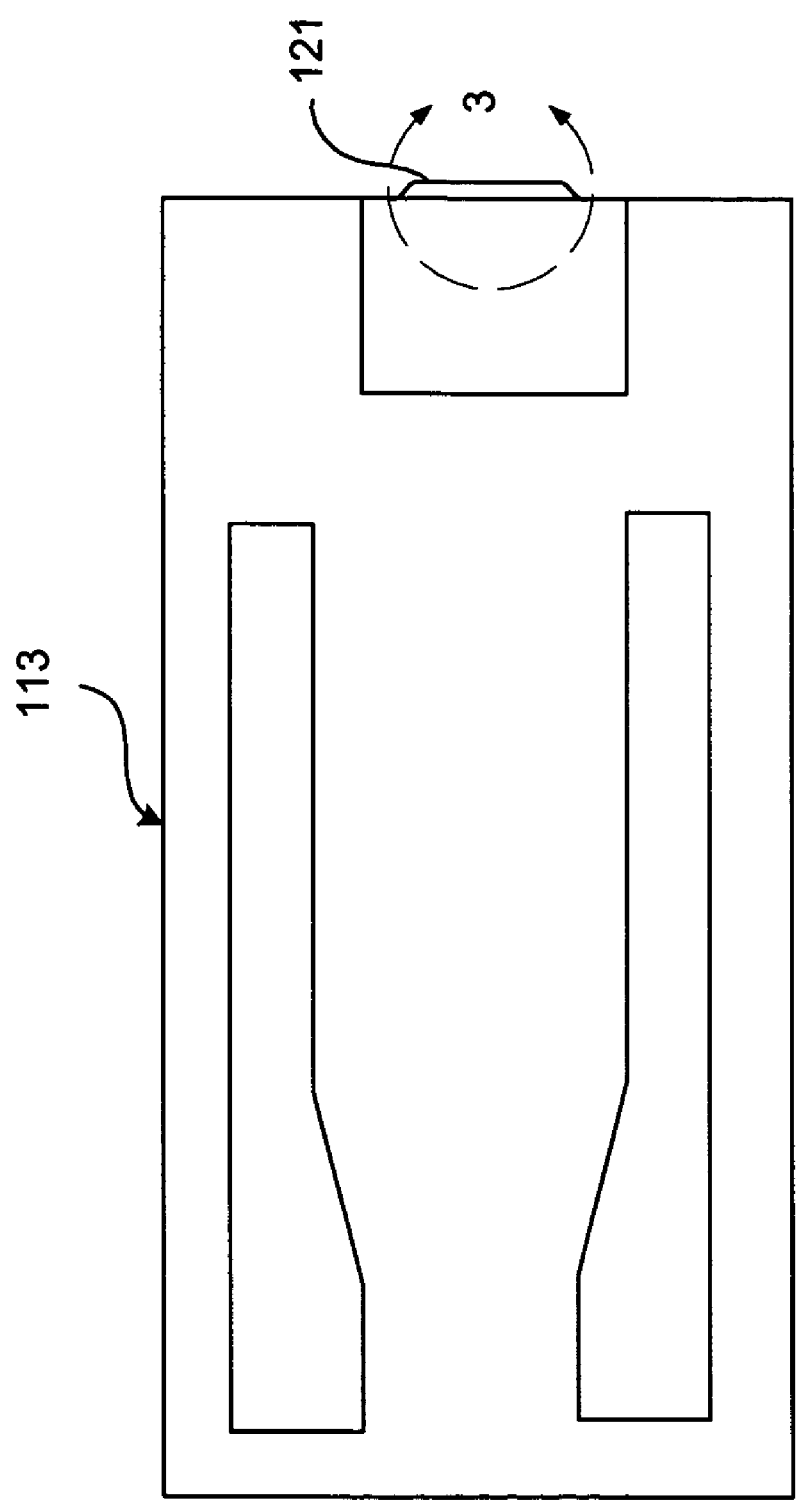
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
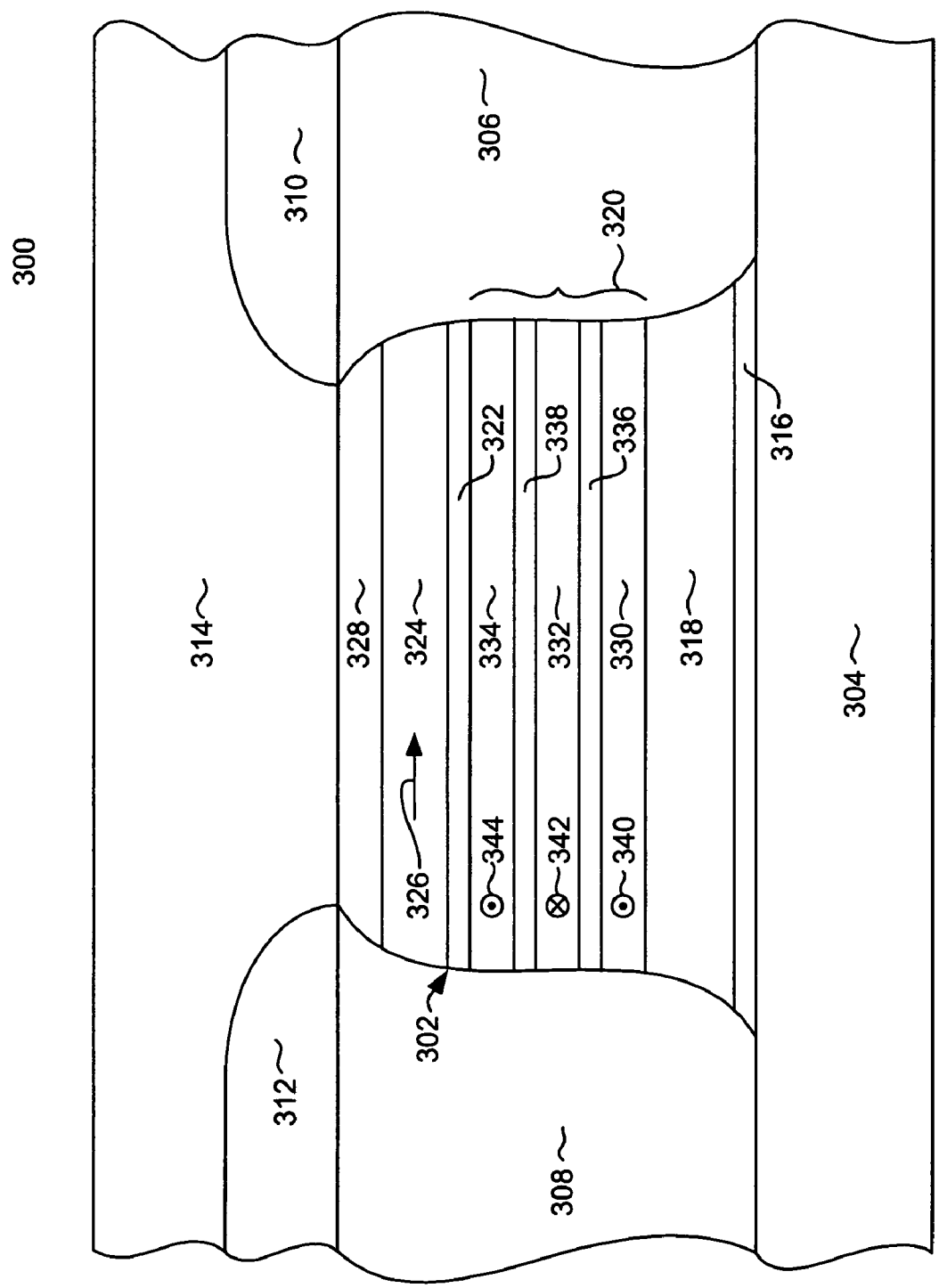
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a sensor stack 302 formed on a dielectric first gap layer 304, which may be for example $Al_2O_3$ or some other non-magnetic electrically insulating material. First and second hard bias layers 306, 308, constructed of a magnetically hard (ie. high coercivity) material such as CoPtCr extend laterally outward from first and second laterally opposed sides of the sensor stack 302. First and second electrically conductive leads 310, 312 are formed over the hard bias layers 306, 308. The inner terminations of the leads 310, 312 define an active area of the sensor or track width (TW). In addition, a second non-magnetic, dielectric gap layer 314 is provided over the top of the sensor stack 302 and leads 310, 312.

The sensor stack 302 may include a seed layer 316 at the bottom of the sensor stack 302, upon which the other layers of the sensor stack 302 can be formed. The seed layer 316 is formed of a material that initiates a desired crystalline structure. This structure is carried through to subsequently deposited layer, ensuring optimal GMR performance. The seed layer 316 can be for example layers of $Al_2O_3$ (30 Angstroms), NiFeCr (25 Angstroms) and NiFe (8 Angstroms). Other possible seed layers may also be used, such as Cu or layers of Ta and NiFeCr.

A layer of antiferromagnetic material (AFM layer) 318 is formed over the seed layer 316. Several possible AFM materials may be familiar to those skilled in the art, but the AFM is preferably constructed of IrMnCr. IrMnCr has the advantage that it can allow the use of a thinner AFM layer than would be possible with other AFM materials such as PtMn. A pinned layer structure 320 is formed over and exchange coupled with the AFM layer 318. The construction of the pinned layer structure 320 will be discussed in further detail herein below.

A non-magnetic, electrically conductive spacer layer 322, such as Cu, sits atop the pinned layer structure, and a magnetic free layer 324 is formed over the spacer layer 322. The free layer 324 can be constructed of several electrically conductive, magnetic materials including Co, CoFe, and NiFe. The free layer 324 can be constructed as one or more layers of such materials, but preferably includes a layer of Co or CoFe adjacent to the spacer layer. Another layer, such as NiFe could be provided away from the spacer, being formed on top of the Co or CoFe layer.

The free layer 324 has a magnetic moment 326 that is biased in a direction parallel with the air bearing surface ABS.

Although the moment 326 of the free layer 324 is biased in the direction parallel to the ABS as shown, it is not pinned and is free to rotate in the presence of a magnetic field. Biasing is provided by exchange coupling with the first and second hard bias layers 306, 308. The first and second hard bias layers 306, 308 are constructed of a high coercivity magnetic material such as CoPtCr, which, when magnetized, maintains its magnetization indefinitely. Finally, a capping layer 328, can be provided over the free layer 324 to protect the sensor from damage during subsequent manufacturing processes. The capping layer 328 can be constructed of many materials depending upon design and manufacturing needs. Such materials include, for example: Cu/Ta, Ta, Ru and $Al_2O_3$.

With continued reference to FIG. 3, the pinned layer 320 includes three antiparallel coupled ferromagnetic layers, a first ferromagnetic layer 330, a second ferromagnetic layer 332, and a third ferromagnetic layer 334. The first and second ferromagnetic layers 330, 332 are separated by and antiparallel coupled across a first non-magnetic, electrically conductive antiparallel coupling layer 336. A second non-magnetic, electrically conductive antiparallel coupling layer 338 separates and antiparallel couples the second ferromagnetic layer 332 and the third antiferromagnetic layer 334. The first and second AP coupling layers 336, 338 can be constructed of for example Ru or some other suitable material, and can each have a thickness of 2 to 8 Angstroms or about 4 Angstroms.

The first ferromagnetic layer 330 has a magnetic moment 340 that is pinned in a first direction that is perpendicular to the ABS and perpendicular to the biased direction of the moment 326 of the free layer 324. The first ferromagnetic layer 330 is exchange coupled with the AFM layer 318 which strongly fixes the moment 340 of the first ferromagnetic layer. The first ferromagnetic layer 330 is preferably constructed of $CoFe_{23}$ and may have an Fe content of 20 to 30 percent. This material has been found to exhibit good exchange coupling with IrMnCr. The first ferromagnetic layer 330 preferably has a thickness of 15 to 25 Angstroms or about 10 Angstroms.

The second ferromagnetic layer 332 is preferably constructed of CoFeV having 45 to 55 atomic percent or about 50 atomic percent Fe and having 2 to 8 atomic percent or about 2 atomic percent V. The second ferromagnetic layer 332 has a magnetic moment 342 that is pinned in a second direction that is antiparallel with the magnetic moment 340 of the first ferromagnetic layer. The second ferromagnetic layer 332 preferably has a thickness of 20 to 30 Angstroms or about 24 Angstroms.

The third magnetic layer 334 is preferably constructed of CoFe having 5 to 15 atomic percent or about 10 atomic percent Fe. CoFe having about 10 atomic percent Fe has been found to provide good GMR properties when disposed adjacent to the spacer layer of a GMR sensor. The third ferromagnetic layer 334 preferably 15 to 25 Angstroms thick or about 20 Angstroms thick. The third ferromagnetic layer 334 is antiparallel coupled with the second ferromagnetic layer 332, and has a magnetic moment 344 that is pinned in the first direction, parallel with the moment 340 of the first ferromagnetic layer 330 and antiparallel with the moment 342 of the second ferromagnetic layer 332. It should be pointed out that, although the moments 340 and 344 are depicted as being out of the ABS and the moment 342 is depicted as being into the ABS, these moments could be reversed so long as the circuitry for reading, signals from the sensor 300 is designed to read signals from a sensor having that polarity.

With reference still to FIG. 3, the trilayer structure provides improved pinning strength for the pinned layer 320. The ferromagnetic layers 330, 332, 334 have a positive magnetostriction which when combined with the compressive forces which are inevitably present in the sensor cause the pinned layer 320 to have a strong magnetic anisotropy perpendicular to the ABS. This greatly assists the pinning provided by the AFM layer 318. The second ferromagnetic layer 332 has been constructed of a material that optimizes magnetostriction, although it is not optimal for either exchange coupling with the AFM layer 318 for providing optimal spin scattering with the spacer layer 322. By placing this layer in the center of the pinned structure 320, one can take advantage of the strong positive magnetostriction of the second ferromagnetic layer, without sacrificing GMR effect or exchange coupling. For purposes of comparison, the magnetic anisotropy of $CoFe_{23}$ is 0.310×E-5, whereas the magnetic anisotropy of $CoFe_{50}$ is 0.7×10E-5.

One might recognize that in a current in plane sensor 300 such as that described, the use of a trilayer pinned structure might increase current shunting. The addition of V, however, alleviates this effect by increasing the electrical resistivity of the second ferromagnetic layer 332. In fact the V so effectively increases the resistance, that the total current shunting through the pinned structure 320 is actually less than that through a prior art bi-layer pinned layer structure. Whereas the resistance of a typical prior art pinned structure is about 30 Ohms/sq, the resistance of the pinned structure of the present invention is about 38 Ohm/sq.

Those skilled in the art will recognize that a "magnetic thickness" can be defined as the physical thickness of a layer of magnetic material multiplied by the magnetic moment of the material. In order to provide optimal pinning, the pinned structure of the present invention is preferably designed so that the second ferromagnetic layer 332 has a magnetic thickness that is about equal to the magnetic thickness of the first and third ferromagnetic layers 330, 334 combined.

It should also be pointed out that the present invention has been described with reference to a current in plane (CIP) sensor. However, the trilayer structure would provide equally superior pinning if used in a current perpendicular to plane (CPP) sensor. However, if the sensor were designed as a CPP sensor, current shunting through the pinned layer structure would not be an issue. Therefore, in a CPP structure, the second ferromagnetic layer could be constructed of CoFe having about 50 atomic percent Fe. The inclusion of V in the second ferromagnetic layer would not be necessary, because the increased resistance would not be needed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive sensor, comprising:
   a magnetic free layer;
   a magnetic pinned layer;
   a non-magnetic, electrically conductive spacer layer disposed between the free layer and the pinned layer; and
   an layer of antiferromagnetic material (AFM layer) exchange coupled with the pinned layer;
   the pinned layer further comprising:
      a first layer of ferromagnetic material;
      a second layer of ferromagnetic material, antiparallel coupled with the first ferromagnetic layer;
      a third layer of ferromagnetic material, antiparallel coupled with the second ferromagnetic layer;

the second ferromagnetic layer comprising Co, Fe and V and each of the first and third layers consisting of CoFe.

2. A magnetoresistive sensor as in claim 1, wherein the AFM layer comprises IrMnCr.

3. A magnetoresistive sensor as in claim 1 wherein the first ferromagnetic layer comprises CoFe with 20 to 30 atomic percent Fe.

4. A magnetoresistive sensor as in claim 1 wherein the first ferromagnetic layer comprises CoFe with about 23 atomic percent Fe.

5. A magnetoresistive sensor as in claim 1 wherein the first ferromagnetic layer comprises CoFe with 20 to 30 atomic percent Fe and has a thickness of 5 to 15 Angstroms.

6. A magnetoresistive sensor as in claim 1 wherein the first ferromagnetic layer comprises CoFe with about 23 atomic percent Fe and wherein the first ferromagnetic layer has a thickness of about 10 Angstroms.

7. A magnetoresistive sensor as in claim 1 wherein the second ferromagnetic layer comprises CoFeV with 45 to 55 atomic percent Fe and 2 to 10 atomic percent V.

8. A magnetoresistive sensor as in claim 1 wherein the second ferromagnetic layer comprises CoFeV with about 50 atomic percent Fe and about 2 atomic percent V.

9. A magnetoresistive sensor as in claim 1 wherein the second ferromagnetic layer comprises CoFeV with 45 to 55 atomic percent Fe and 2 to 10 atomic percent V and wherein the second ferromagnetic layer has a thickness of 20 to 30 Angstroms.

10. A magnetoresistive sensor as in claim 1 wherein the second ferromagnetic layer comprises CoFeV with about 50 atomic percent Fe and about 2 atomic percent V, and wherein the second ferromagnetic layer has a thickness of about 24 Angstroms.

11. A current perpendicular to plane magnetoresistive sensor, comprising:
    a magnetic free layer;
    a magnetic pinned layer;
    a non-magnetic, electrically conductive spacer layer disposed between the free layer and the pinned layer; and
    an layer of antiferromagnetic material (AFM layer) exchange coupled with the pinned layer;
    the pinned layer further comprising:
        a first layer of ferromagnetic material;
        a second layer of ferromagnetic material, antiparallel coupled with the first ferromagnetic layer;
        a third layer of ferromagnetic material, antiparallel coupled with the second ferromagnetic layer;
        the first and third ferromagnetic layers consisting of CoFe, and the second ferromagnetic layer comprising CoFeV and being located between the first and third ferromagnetic layers.

12. A magnetoresistive sensor as in claim 11, wherein the first ferromagnetic layer has about 23 atomic percent Fe, the second ferromagnetic layer has about 50 atomic percent Fe and the third ferromagnetic layer has about 10 atomic percent Fe.

13. A magnetoresistive sensor as in claim 1 wherein the magnetoresistive sensor is a current in plane sensor.

14. A magnetoresistive sensor as in claim 1 wherein the third ferromagnetic layer comprises CoFe having 5 to 15 atomic percent Fe.

15. A magnetoresistive sensor as in claim 1 wherein the third ferromagnetic layer comprises CoFe having about 10 atomic percent Fe.

16. A magnetoresistive sensor as in claim 1 wherein the third ferromagnetic layer comprises CoFe having 5 to 15 atomic percent Fe and wherein the third magnetic layer has a thickness of 15 to 25 Angstroms.

17. A magnetoresistive sensor as in claim 1 wherein the third ferromagnetic layer comprises CoFe having about 10 atomic percent Fe and wherein the third magnetic layer has a thickness of about 20 Angstroms.

18. A magnetoresistive sensor as in claim 1, wherein:
    the first ferromagnetic layer has comprises CoFe having 20 to 30 atomic percent Fe, and has a thickness of 5 to 15 Angstroms;
    the second ferromagnetic layer comprises CoFeV having 45 to 55 atomic percent Fe and 2 to 10 atomic percent V, and has a thickness of 20 to 30Angstroms; and
    the third ferromagnetic layer comprises CoFe having 5 to 15 atomic percent Fe, and has a thickness of 15 to 25 Angstroms.

19. A magnetoresistive sensor as in claim 1, wherein:
    the first ferromagnetic layer comprises CoFe with about 23 atomic percent Fe, and has a thickness of about 10 Angstroms;
    the second ferromagnetic layer comprises CoFeV with about 50 atomic percent Fe and about 2 atomic percent V, and has a thickness of about 24 Angstroms; and
    the third ferromagnetic layer comprises CoFe with about 10 atomic percent Fe, and has a thickness of about 20 Angstroms.

20. A magnetoresistive sensor as in claim 1 wherein the second ferromagnetic layer has a magnetic thickness that is substantially equal to the sum of the magnetic thickness of the first ferromagnetic layer and the third ferromagnetic layer.

21. A magnetoresistive sensor as in claim 1, wherein:
    the first and second ferromagnetic layers are separated by a first non-magnetic, electrically conductive antiparallel coupling layer; and
    the second and third ferromagnetic layers are separated from one another by a second non-magnetic, electrically conductive antiparallel coupling layer.

22. A magnetoresistive sensor as in claim 21 wherein the first and second antiparallel coupling layer comprise Ru.

23. A magnetoresistive sensor as in claim 21 wherein the first and second antiparallel coupling layers each comprise Ru and have a thickness of 2 to 8 Angstroms.

24. A magnetic data storage system, comprising:
    a magnetic medium;
    an actuator;
    a slider connected with the actuator for movement adjacent to a surface of the magnetic medium; and
    a magnetoresistive sensor connected with the slider, the magnetoresistive sensor further comprising:
        a magnetic free layer;
        a magnetic pinned layer;
        a non-magnetic, electrically conductive spacer layer disposed between the free layer and the pinned layer; and
        an layer of antiferromagnetic material (AFM layer) exchange coupled with the pinned layer;
        the pinned layer further comprising:
            a layer of ferromagnetic material;
            a second layer of ferromagnetic material, antiparallel coupled with the first ferromagnetic layer;
            a third layer of ferromagnetic material, antiparallel coupled with the second ferromagnetic layer;
            the second ferromagnetic layer comprising Go, Fe and V and each of the first and third layers consisting of CoFe.

* * * * *